(12) United States Patent
Yoshida et al.

(10) Patent No.: US 8,496,348 B2
(45) Date of Patent: Jul. 30, 2013

(54) LINEAR LIGHT SOURCE AND ELECTRONIC APPARATUS

(75) Inventors: Yohhei Yoshida, Osaka (JP); Mototaka Taneya, Osaka (JP); Jun Okazaki, Osaka (JP); Tomotake Tanaka, Osaka (JP); Takuya Shigenobu, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 281 days.

(21) Appl. No.: 13/119,391

(22) PCT Filed: Sep. 1, 2009

(86) PCT No.: PCT/JP2009/065254
§ 371 (c)(1),
(2), (4) Date: Mar. 16, 2011

(87) PCT Pub. No.: WO2010/038573
PCT Pub. Date: Apr. 8, 2010

(65) Prior Publication Data
US 2011/0175549 A1   Jul. 21, 2011

(30) Foreign Application Priority Data
Oct. 2, 2008   (JP) ................. 2008-257535

(51) Int. Cl.
*F21V 21/00*   (2006.01)
*H05B 37/02*   (2006.01)

(52) U.S. Cl.
USPC ............... 362/217.01; 362/249.02; 362/84; 362/225; 315/294; 315/158

(58) Field of Classification Search
USPC .............. 315/294, 158, 287; 362/249.02, 362/84, 326, 217.01, 222, 97.1, 225, 158, 362/183, 101, 551; 385/141, 11, 31, 33, 37, 385/39, 50
See application file for complete search history.

(56) References Cited

U.S. PATENT DOCUMENTS 4,997,259 A * 3/1991 Ichimura et al. ............. 385/115
7,837,345 B2 * 11/2010 Choi et al. .................... 362/101
(Continued)

FOREIGN PATENT DOCUMENTS

| | | |
|---|---|---|
| CN | 1739199 | 2/2006 |
| JP | 11-298014 | 10/1999 |

(Continued)

OTHER PUBLICATIONS

International Search Report mailed Oct. 13, 2009, directed to corresponding International Patent Application No. PCT/JP2009/065254; 4 pages.

*Primary Examiner* — Vibol Tan
(74) *Attorney, Agent, or Firm* — Morrison & Foerster LLP

(57) ABSTRACT

A linear light source (20), which emits light by causing light to propagate in a linear material (11) in which incoming light can be propagated, includes: a light emitting device (12), provided on a side of one end of the linear material (11), which emits light so that the light enters the one end of the linear material (11); and a light receiving device (21), provided on a side of the other end of the linear material (11), which detects the light which has propagated in the linear material (11). With the configuration, it is possible to provide: a linear light source in which an abnormal condition, such as breaking of a linear material, can be detected; and an electronic apparatus including the linear light source.

12 Claims, 15 Drawing Sheets

U.S. PATENT DOCUMENTS

| | | |
|---|---|---|
| 2004/0161192 A1 | 8/2004 | Hamano et al. |
| 2006/0262530 A1 | 11/2006 | Sakai et al. |
| 2007/0121684 A1 | 5/2007 | Yamazaki et al. |
| 2007/0122103 A1 | 5/2007 | Yamazaki et al. |
| 2007/0229938 A1 | 10/2007 | Yamazaki et al. |
| 2009/0303700 A1* | 12/2009 | Choi et al. ............... 362/158 |
| 2011/0286222 A1* | 11/2011 | Coleman ............... 362/326 |
| 2012/0106127 A1* | 5/2012 | Hattori et al. ............... 362/84 |
| 2012/0212931 A1* | 8/2012 | Kinoshita et al. ............... 362/84 |
| 2012/0275154 A1* | 11/2012 | Hood et al. ............... 362/249.02 |

FOREIGN PATENT DOCUMENTS

| | | |
|---|---|---|
| JP | 2003-347068 | 12/2003 |
| JP | 2004-199985 | 7/2004 |
| JP | 2004-342405 | 12/2004 |
| JP | 2006-71776 | 3/2006 |
| JP | 2006-147836 | 6/2006 |
| JP | 2006-331659 | 12/2006 |
| JP | 2007-155820 | 6/2007 |
| JP | 2007-157764 | 6/2007 |

* cited by examiner

LINEAR LIGHT SOURCE AND ELECTRONIC APPARATUS

TECHNICAL FIELD

The present invention relates to (i) a linear light source, in which light is transmitted through within a optical fiber or the like so that the linear light source carries out light emission, and (ii) an electronic apparatus including the linear light source.

BACKGROUND ART

A linear light source has been increasingly used for a light source of a various type of an apparatus. The linear light source is made up of a combination of (i) a light emitting device, such as a light emitting diode (LED) or a semiconductor laser, and (ii) a linear material, such as a optical fiber, which can transmit light. The linear light source is so that light coming from a light emitting device is incident on an end of the linear material and transmitted through within the linear material so that the linear material carries out light emission (see, for example, patent literatures 1 to 3).

In some linear materials, light coming from a semiconductor laser is transmitted through within a linear material so that an illumination effect can be brought about. In this type of the linear light sources, however, there is a case that semiconductor laser light incident on one end of the linear material is directly outputted from the other end of the linear material. Since the semiconductor laser light has a high energy density, such case involves a risk that causes a danger to a human body, in particular to eyes. Therefore, it is necessary that the linear light sources using the semiconductor laser include a structure for avoiding the risk.

An example of the linear light source including the structure encompasses an illumination apparatus of the patent literature 4 in which a light emitting device is provided within a optical fiber so that the light emitting device and the optical fiber are integrated with each other. In the illumination device, it is possible that light be kept from leaking, and the light emitting device and the optical fiber be combined to each other at a greater efficiency.

CITATION LIST

Patent Literature 1
Japanese Patent Application Publication, Tokukai, No. 2006-71776 A (Publication Date: Mar. 16, 2006)
Patent Literature 2
Japanese Patent Application Publication, Tokukai, No. 2007-157764 A (Publication Date: Jun. 21, 2007)
Patent Literature 3
Japanese Patent Application Publication, Tokukai, No. 2007-155820 A (Publication Date: Jun. 21, 2007)
Patent Literature 4
Japanese Patent Application Publication, Tokukaihei, No. 11-298014 A (Publication Date: Oct. 29, 1999)

SUMMARY OF INVENTION

Technical Problem

The configurations of the patent literatures 1 to 4 have drawbacks that, in a case where a linear material is broken (cut into pieces), semiconductor laser light is emitted outside the linear material. That is, with the configurations of the patent literatures 1 to 4, it is impossible to detect an abnormal condition such as a breakage of the linear material, a malfunction or a removal of a light emitting device, or the like.

The present invention is made in view of the problem, and an object of the present invention is to provide (i) a linear light source in which an abnormal condition, such as a breakage of a linear material, can be detected, and (ii) an electronic apparatus including the linear light source.

Solution to Problem

In order to attain the object, a linear light source of the present invention is a linear light source, which emits light by causing light to propagate in a linear material in which incoming light can be propagated, the linear light source including: a first light emitting device, provided on a side of one end of the linear material, which emits light so that the light enters the one end of the linear material; and a light receiving device, provided on a side of the other end of the linear material, which detects the light which has propagated in the linear material.

According to the configuration, the light having propagated in the linear material is detected by the light receiving device. Regarding this, in a case of an abnormal situation such as an abnormal situation in which (i) the linear material is broken and/or unexpectedly bent, and/or (ii) the light emitting device has a failure in its function and/or is displaced, there will be a great change in a light propagation amount detected by the light receiving device, as compared to a case of a normal situation. According to the linear light source, it is therefore possible to detect an occurrence of the abnormal situation by checking the light propagation amount.

In order to attain the object, a linear light source of the present invention is a linear light source, which emits light by causing light to propagate in a linear material in which incoming light can be propagated, the linear light source including: first and second light emitting devices, respectively provided on sides of first and second ends of the linear material, which include first and second built-in light receiving devices, respectively, the first and second light emitting devices emitting first and second light so that (i) the first and second light respectively enter the first and second ends of the linear material, and (ii) the first built-in light receiving device detects the second light which has propagated in the linear material, whereas the second built-in light receiving device detects the first light which has propagated in the linear material.

According to the configuration, the first light having propagated in the linear material is detected by the second built-in light receiving device, whereas the second light having propagated in the linear material is detected by the first built-in light receiving device. Regarding this, in a case of an abnormal situation such as an abnormal situation in which (i) the linear material is broken and/or unexpectedly bent and/or (ii) the first and second light emitting devices have a failure in their functions and/or are displaced, there will be a great change in each of light propagation amounts of the first and second light detected by the first and second built-in light receiving devices, as compared to a case of a normal situation. According to the linear light source, it is therefore possible to detect an occurrence of the abnormal situation by checking the light propagation amounts.

An electronic apparatus of the present invention includes any of the linear light sources described above.

Advantageous Effects of Invention

As described earlier, a linear light source of the present invention includes: a first light emitting device, provided on a side of one end of the linear material, which emits light so that the light enters the one end of the linear material; and a light receiving device, provided on a side of the other end of the linear material, which detects the light which has propagated in the linear material.

According to the configuration, the light having propagated in the linear material is detected by the light receiving device. Regarding this, in a case of an abnormal situation such as an abnormal situation in which (i) the linear material is broken and/or unexpectedly bent and/or (ii) the light emitting device has a failure in its function and/or is displaced, there will be a great change in a light propagation amount detected by the light receiving device, as compared to a case of a normal situation. It is therefore possible to provide a linear light source in which an occurrence of the abnormal situation can be detected by checking the light propagation amount.

A linear light source of the present invention includes: first and second light emitting devices, respectively provided on sides of first and second ends of the linear material, which include first and second built-in light receiving devices, respectively, the first and second light emitting devices emitting first and second light so that (i) the first and second light respectively enter the first and second ends of the linear material, and (ii) the first built-in light receiving device detects the second light which has propagated in the linear material, whereas the second built-in light receiving device detects the first light which has propagated in the linear material.

According to the configuration, the first light having propagated in the linear material is detected by the second built-in light receiving device, whereas the second light having propagated in the linear material is detected by the first built-in light receiving device. Regarding this, in a case of an abnormal situation such as an abnormal situation in which (i) the linear material is broken and/or unexpectedly bent and/or (ii) the first and second built-in light emitting devices have a failure in their function and/or are displaced, there will be a great change in each of light propagation amounts of the first and the second light detected by the first and second built-in light receiving devices, as compared to a case of a normal situation. It is therefore possible to provide a linear light source in which an occurrence of the abnormal situation can be detected by checking the light propagation amounts.

An electronic apparatus of the present invention includes any of the linear light sources described above.

Thus, by providing such equipments and apparatuses with a safety system for detecting an occurrence of an abnormal situation and thereby preventing light leakage, it is possible to remove a risk such as one that leaked light enters human eyes.

Figure 23:
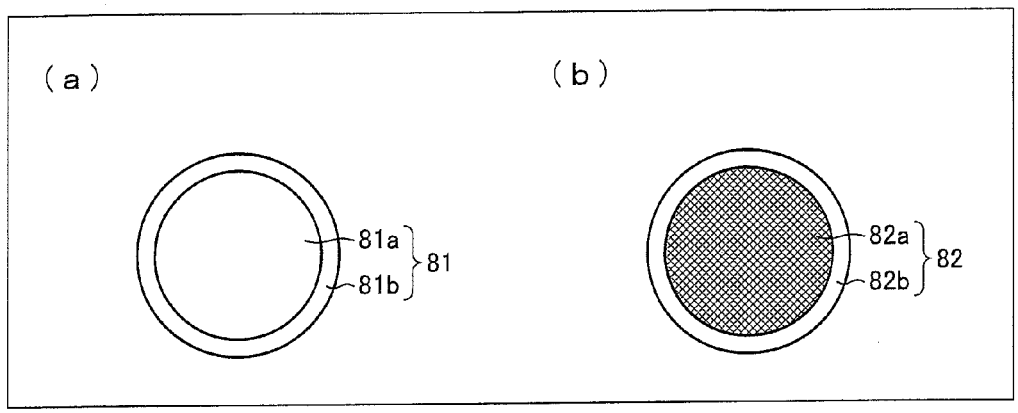

(a) and (b) of FIG. 23 are cross sectional view showing a linear material of the linear light source. (a) of FIG. 23 shows a cross section of a first linear material section. (b) of FIG. 23 shows a cross section of a second linear material section.

Figure 24:
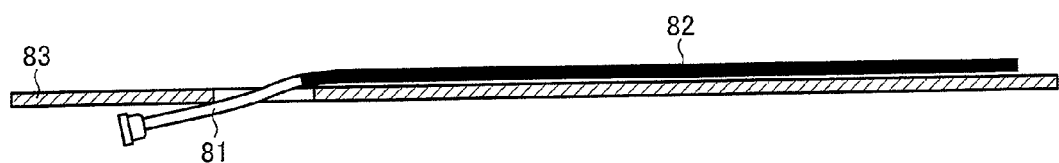

FIG. 24 is a side view showing a use example of the linear light source.

Figure 25:
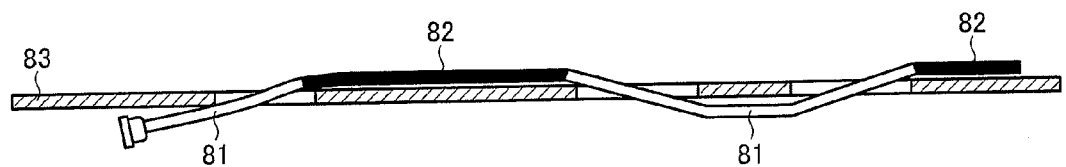

FIG. 25 is a side view showing a use example of the linear light source.

Figure 26:
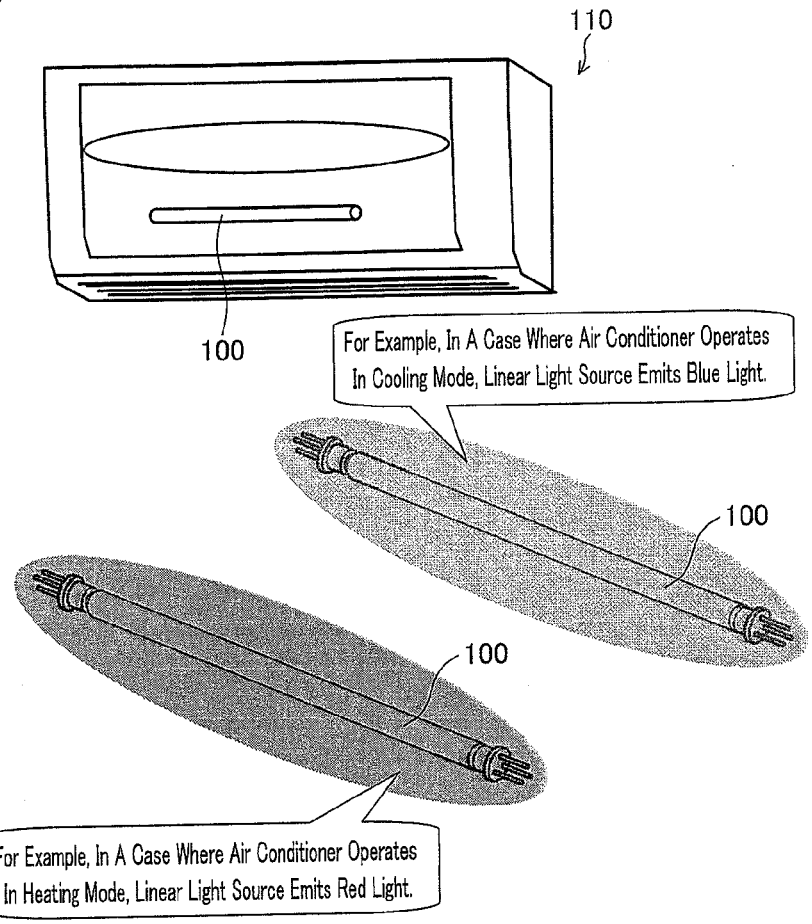

FIG. 26 is a view showing an electronic apparatus in accordance with one embodiment of the present invention.

Figure 27:
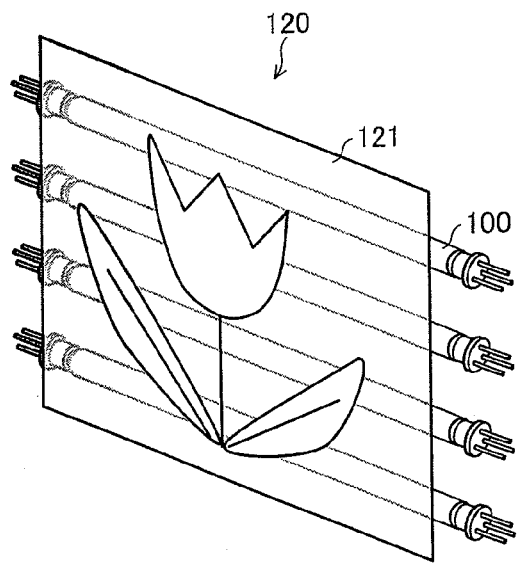

FIG. 27 is a view showing a display apparatus in accordance with one embodiment of the present invention.

Figure 28:
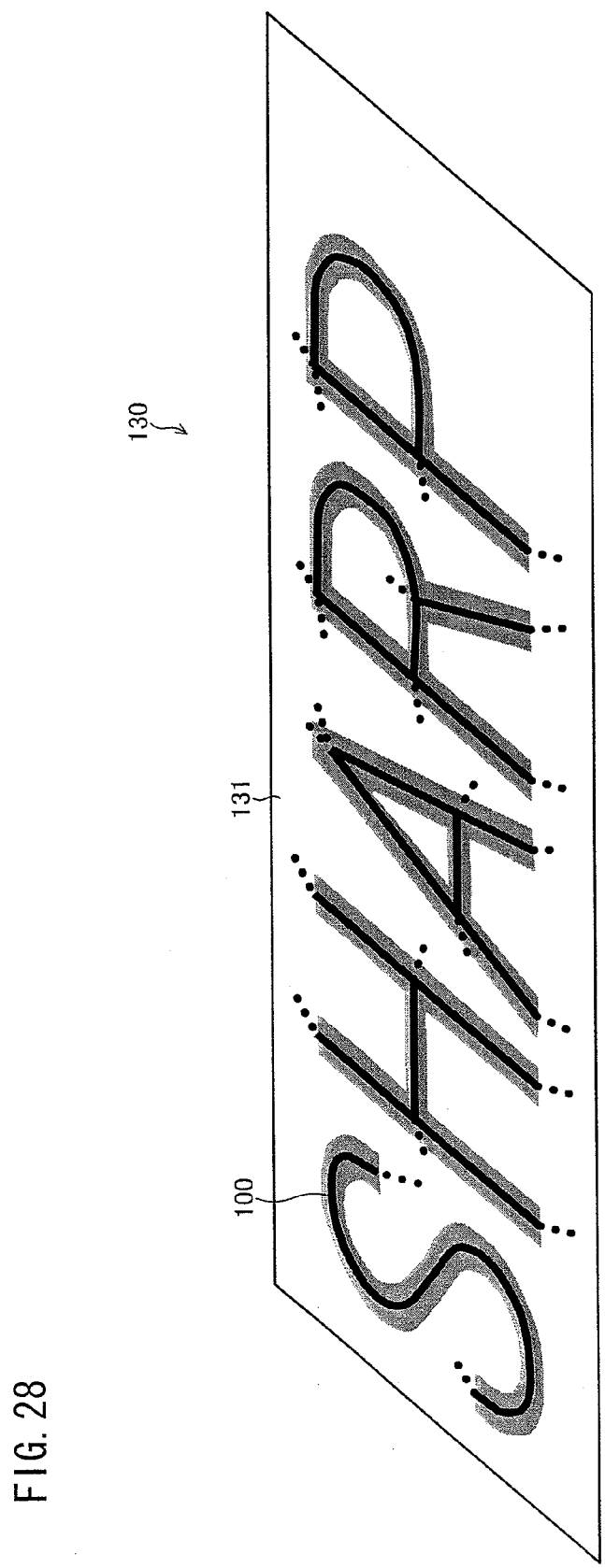

FIG. 28 is a view showing an illumination apparatus in accordance with one embodiment of the present invention.

Figure 29:
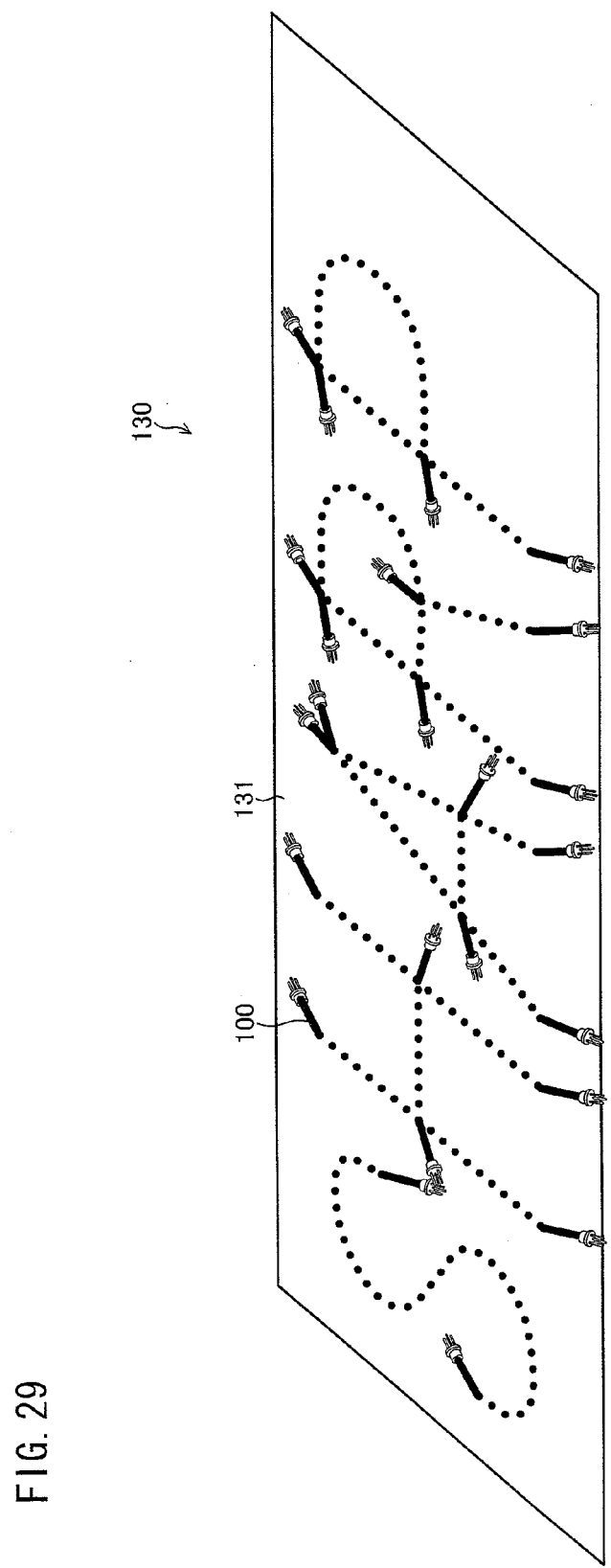

FIG. 29 is a view showing a rear surface of the illumination device.

DESCRIPTION OF EMBODIMENTS

Embodiment 1

One embodiment of the present invention is described below with reference to the drawings. The following description first discusses how linear light sources of the present embodiment are fundamentally configured, and then discusses how linear light sources of the present embodiment are concretely configured.

(Fundamental Configuration of Linear Light Source)

Figure 1:
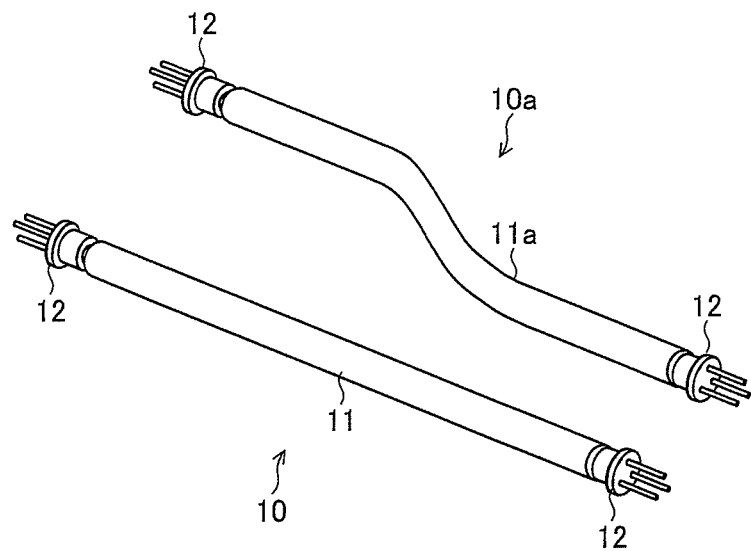
FIG. 1 is a perspective view showing one example of how a linear light source of the present invention is fundamentally configured.
Figure 2:
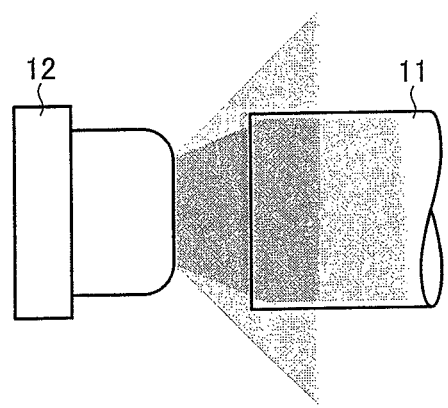
FIG. 2 is a side view showing how a part of the linear light source is configured in which part a light emitting device is provided.

FIG. 1 is a perspective view showing how linear light sources 10 and 10a are configured. FIG. 2 is a side view showing part of the linear light source 10 (10a) in which part a light emitting device 12 is provided.

As shown in FIGS. 1 and 2, the linear light source 10 includes a linear material 11 and two (2) light emitting devices 12.

The linear material 11 is a linear material which allows incoming light to propagate in the linear material 11. The linear material 11 is, for example, an optical fiber. The linear material 11 is made from an unbendable material.

The light emitting devices 12 are light devices for emitting visible light. The light emitting devices 12 are provided so as to be away, by a predetermined distance, from respective ends of the linear material 11. As shown in FIG. 2, each of the light emitting devices 12 is provided so that light emitted from each of the light emitting devices 12 enters a corresponding one of end surfaces of the linear material 11.

The linear light source 10 thus includes the light emitting devices 12 provided so as to face the respective ends of the linear material 11. This causes the light emitted from each of the light emitting devices 12 to (i) enter the corresponding one of the end surfaces of the linear material 11 and then (ii) propagate in the linear material 11. As such, it is possible to cause the linear material 11 to emit light.

According to the linear light source 10, each of the light emitting devices 12 is provided so as to be away, by the predetermined distance, from the corresponding one of the end surfaces of the linear material 11. It is therefore possible to prevent heat generated by each of the light emitting devices 12 from being conducted to the linear material 11. This makes it possible to prevent the optical property of the linear material 11 from deteriorating due to the heat.

Note that, since the linear light source 10 includes the linear material 11, the linear light source 10 is not bendable. In view of the circumstances, it is therefore possible to replace the linear material 11 by a linear material 11a made from a bendable material. The linear light source 10a includes a linear material 11a and two (2) light emitting devices 12. The linear light source 10a brings about an effect similar to the linear light source 10. Furthermore, the linear light source 10a has an effect of being bendable according to use application.

Figure 3:
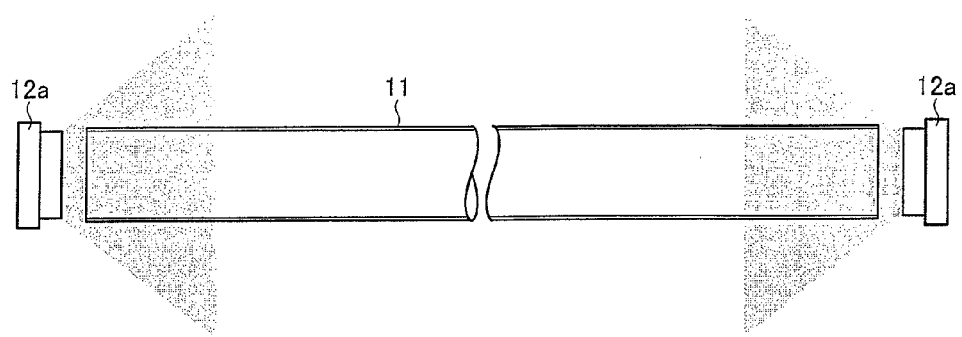
FIG. 3 is a side view showing how the linear light source, which includes an LED device as the light emitting device, is configured.
Figure 4:
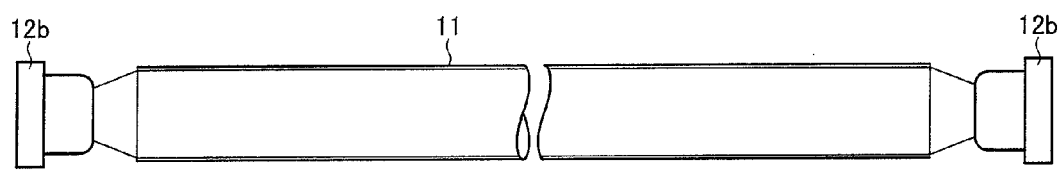
FIG. 4 is a side view showing how the linear light source, which includes a semiconductor laser device as the light emitting device, is configured.

The light emitting devices 12 is not limited to a specific one, provided that they are light devices capable of emitting light. For example, light emitting diodes (LED), semiconductor lasers, or the like can be used as the light emitting devices 12. FIG. 3 shows how a linear light source is configured in which LED devices 12a are used as respective light emitting devices 12. FIG. 4 shows how a linear light source is configured in which semiconductor laser devices 12b are used as respective light emitting devices 12. The semiconductor laser devices are suitable for the light emitting devices 12. This is particularly because semiconductor laser light is easier to propagate in the linear material 11.

According to the linear light source 10 (10a), the light emitting devices 12 are provided to face the respective ends of the linear material 11 (11a). However, the present embodiment is not limited to this. Instead, a single light emitting device 12 can be provided to face only one end of the linear material 11 (11a).

Figure 5:
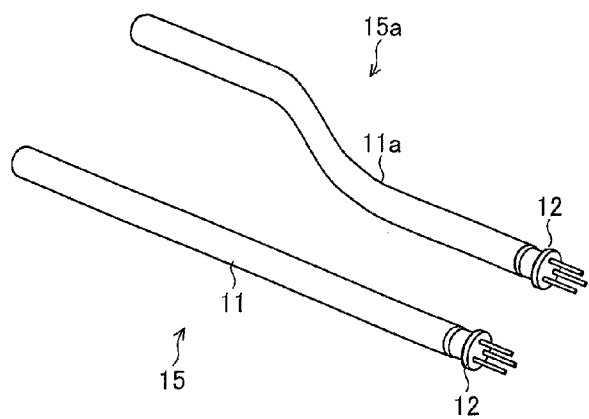
FIG. 5 is a perspective view showing another example of how a linear light source of the present invention is fundamentally configured.

FIG. 5 is a perspective view showing how linear light sources 15 and 15a are configured.

As shown in FIG. 5, the linear light source 15 includes (i) a linear material 11 and (ii) a single light emitting device 12 provided to face a corresponding one of ends of the linear material 11. Similarly, the linear light source 15a includes (i) a linear material 11a and (ii) a single light emitting device 12 provided to face a corresponding one of ends of the linear material 11a. Since the single light emitting device 12 is provided to face the corresponding one of the ends of the linear material 11 (11a), the linear light source 15 (15a) is inferior to the linear light source 10 (10a) in view of light intensity but is superior to the linear light source 10 (10a) in view of electric power consumption.

(Configuration of Linear Light Source)

The following description discusses how a linear light source 20 of the present embodiment is configured.

Figure 6:
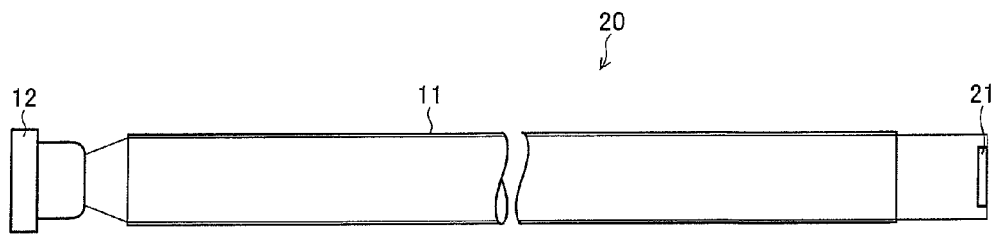
FIG. 6 is a side view showing a linear light source in accordance with one embodiment of the present invention.

FIG. 6 is a side view showing one example of how the linear light source 20 is configured.

As shown in FIG. 6, the linear light source 20 further includes a light receiving device 21 in addition to the configuration of the linear light source 15. Note, however, that the linear light source 20 can be configured to further include a light receiving device 21 in addition to the configuration of the linear light source 15a.

The light receiving device 21 is not limited to a specific one, provided that it is a light device capable of detecting light. For example, a photodiode or the like can be used as the light receiving device 21. The light receiving device 21 is provided to face a first end of a linear material 11 which first end is opposite to a second end which the light emitting device 12 faces. The light receiving device 21 is provided so as to receive light propagated in the linear material 11.

The linear light source 20 thus includes (i) the light emitting device 12 provided to face the second end of the linear material 11 and (ii) the light receiving device 21 provided to face the first end of the linear material 11. In the linear light source 20, it is therefore possible that (i) the linear material 11 is caused to emit light and (ii) the light receiving device 12 detects an amount of light which propagates in the linear material 11 (hereinafter, referred to as light propagation amount). That is, it is possible in the linear light source 20 that the light which enters the second end of the linear material 11 is detected via the first end of the linear material 11.

The basic configuration of the linear light source 20 is the linear light source 15 or 15a in which the light emitted from the light emitting device 12 enters only one of the end surfaces of the linear material 11. However, the present embodiment is not limited to this. Instead, the basic configuration of the linear light source 20 can be the linear light source 10 or 10a in which the light emitted from one of the light emitting device 12 enters one of the end surfaces of the liner material 11 and the light emitted from the other of the light emitting devices 12 enters the other of the end surfaces of the linear material 11.

Figure 7:
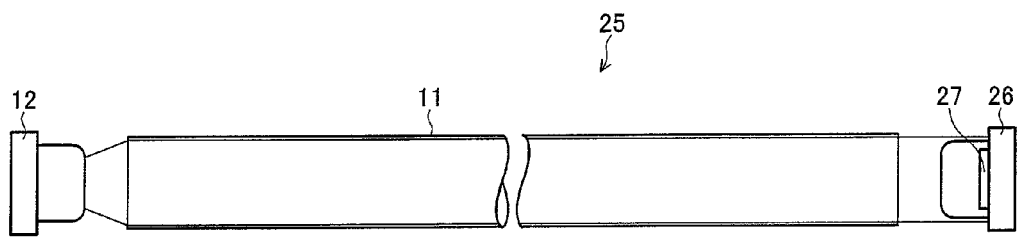
FIG. 7 is a side view showing a linear light source in accordance with another embodiment of the present invention.
Figure 8:
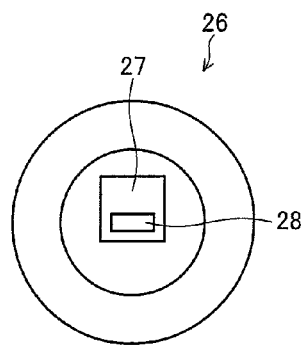
FIG. 8 is a front view showing one example of how a light emitting device in the linear light source, which light emitting device includes a built-in light receiving device, is configured.

FIG. 7 is a side view showing one example of how a linear light source 25 is configured. FIG. 8 is a front view showing one example of how a light emitting device 26 having a built-in light receiving section is configured.

As shown in FIG. 7, the linear light source 25 further includes the light emitting device 26 in addition to the configuration of the linear light source 15 or 15a. That is, the linear light source 25 further includes the light emitting device 26 in addition to the configuration of the linear light source 10 or 10a from which configuration one of the light emitting devices 12 is removed.

As shown in FIG. 8, the light emitting device 26 includes a light receiving section 27 and a light emitting section 28. Note, however, that the light emitting device 26 is not limited to this, provided that it is a device in which (i) a light emitting device includes a built-in light receiving device and (ii) the light emitting device and the built-in light receiving device are provided in a single package. According to the linear light source 25, the light emitting device 26 is provided to a first end of a linear material 11 which first end is opposite to a second end which a light emitting device 12 faces. According to the light emitting device 26, a light receiving surface of the light receiving section 27 and a light emitting surface of the light emitting section 28 are provided in a single plane. Further, the light emitting device 26 is provided so that such a single plane faces the corresponding one of the end surfaces of the linear material 11.

The linear light source 25 thus includes (i) the light emitting device 12 provided to face the second end of the linear material 11 and (ii) the light emitting device 26 provided to face the first end of the linear material 11. This causes the light emitted from each of the light emitting devices 12 and 26 to enter are the corresponding one of the end surfaces of the linear material 11 and propagate in the linear material 11. As such, it is possible to cause the linear material 11 to emit brighter light. According to the linear light source 25, the light receiving section 27 of the light emitting device 26 can detect a light propagation amount of the light propagating in the linear material 11.

Figure 9:
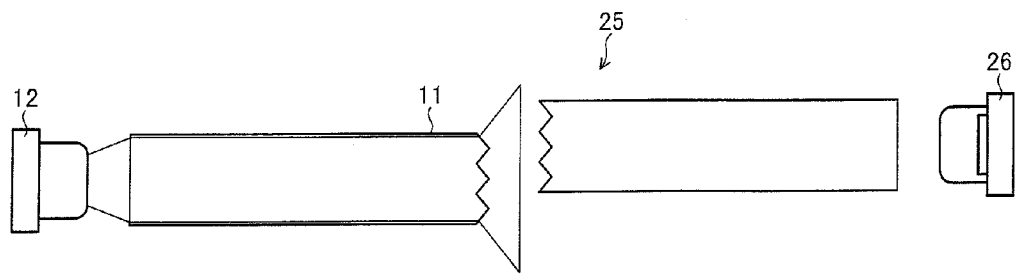
FIG. 9 is a view showing the linear light source which is broken.

In the linear light source 20 (25), an amount of light which enters the light receiving device 21 (light receiving section 27 of the light emitting device 26) varies according to a situation of the light emitting device 12 and/or a situation of the linear material 11. However, in a case of an abnormal situation where the linear material 11 is cut by some shock or the like (see FIG. 9), for example, there will be a great decrease in light propagation amount, as compared to a case where the light normally propagates in the linear material 11. This is because the light emitted from the light emitting device 12 propagates outside the linear material 11.

That is, in a case of the abnormal situation such as a situation in which (i) the linear material 11 is broken and/or unexpectedly bent and/or (ii) the light emitting device has a failure in function and/or is displaced, there will be a great change in the light propagation amount detected by the light receiving device 21 (the light receiving section 27), as compared to the case where the light normally propagates in the linear material 11. As such, by checking the light propagation amount detected by the light receiving device 21 (the light receiving section 27), it is possible to constantly monitor if the abnormal situation occurs or not, and to detect an occurrence of the abnormal situation.

Figure 10:
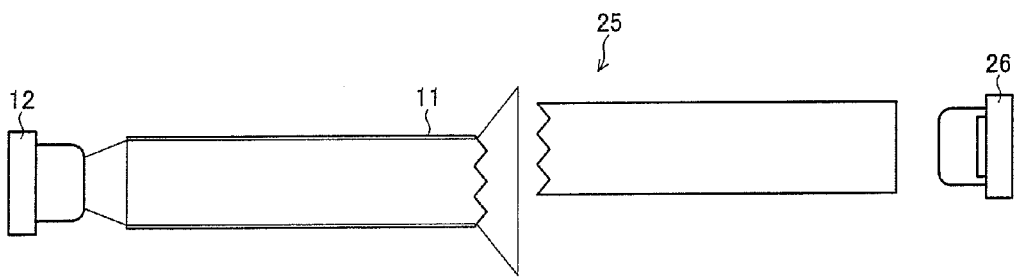
FIG. 10 is a view showing how light emission is controlled in a case where the linear light source is broken.
Figure 10:
Figure 10:
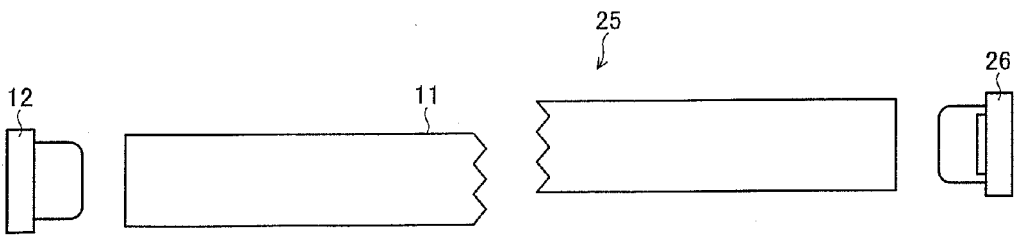

Additionally, in a case where a change in the light propagation amount becomes a predetermined amount, it is further possible to electrically disconnect the light emitting device 12 so that light emission is stopped (see FIG. 10). By providing such safety system (driving system) for preventing any light leakage, it is possible to remove a risk that leaked light enters human eyes.

In the linear light source 25, it is further possible that the light receiving section 27 detects (i) a light propagation amount in the linear material 11 and (ii) an emission amount of the light emitting section 28 provided in the single package. It is therefore possible to check both of the light propagation amount in the linear material 11 and the emission amount of the light emitting section 28. Furthermore, it is possible to adjust light intensity of the light emitting section 28, based on the emission amount of the light emitting section 28 thus detected by the light receiving section 27.

Embodiment 2

Embodiment 2 of the present invention is described below with reference to the drawings. A configuration which is not discussed in the present embodiment is identical with the configuration discussed in Embodiment 1. For easy description, members having the same functions as the members shown in the drawings in Embodiment 1 are given the same reference numerals, and their description is omitted.

The linear light sources 20 and 25 of Embodiment 1 are used as light sources. It is therefore desired that the linear light sources 20 and 25 have greater light intensities and less light unevenness, and emit light having a desired color.

Figure 11:
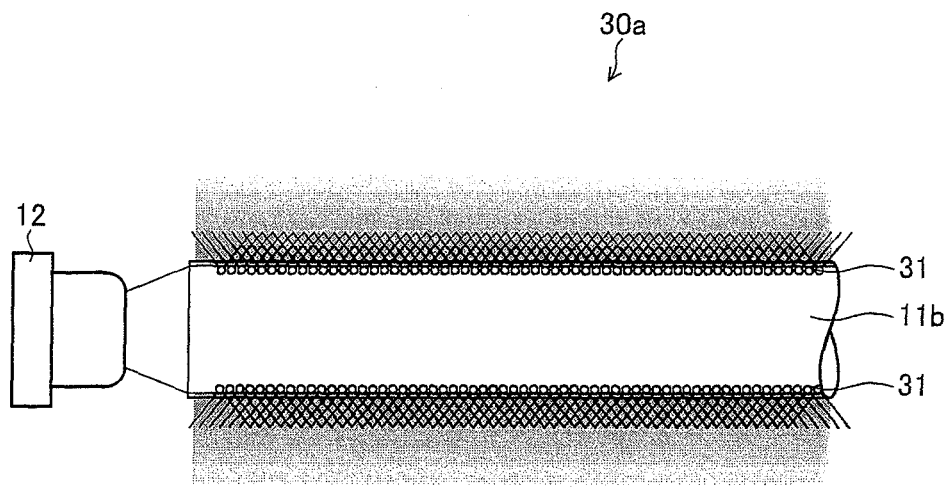
FIG. 11 is a side view showing how light is diffused in the linear light source which includes a linear material containing a light diffusing substance in an outermost layer.

FIG. 11 is a side view showing how light is diffused in a linear light source 30a including a linear material 11b. The linear light source 30a has a configuration identical to that of the linear light source 20, except that the linear light source 30a includes the linear material 11b in place of the linear material 11. The linear material 11b is different from the linear material 11 in that an outermost layer in an internal structure of the linear material 11b contains a light diffusing substance 31.

In the linear light source 30a, light which enters a corresponding one of end surfaces of the linear material 11b is diffused, while propagating in the linear material 11b, near the internal surface of the linear material 11b by the light diffusing substance 31. As such, light passing through the internal surface of the linear material 11b is diffused and directed outside the linear material 11b so that the linear material 11b looks brighter. It is therefore possible to realize a light source that emits light which is less significant in luminance unevenness and brighter in luminance.

Figure 12:
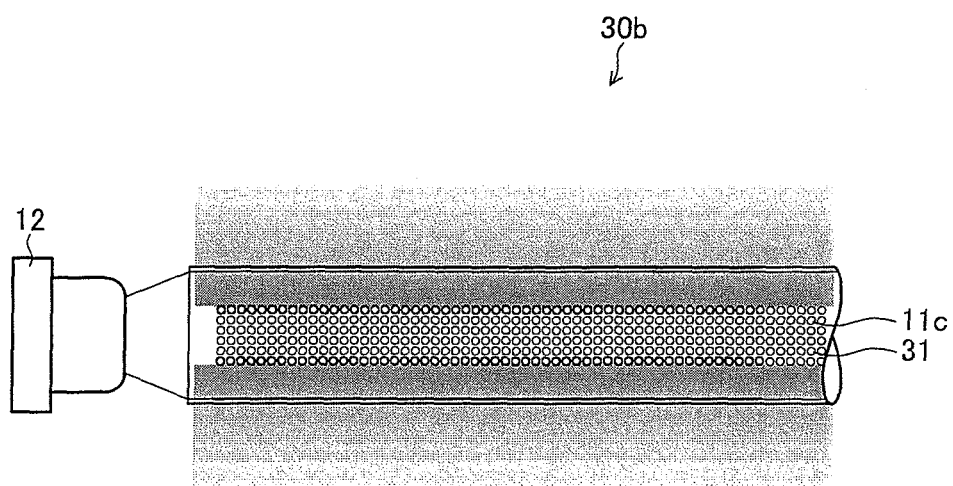
FIG. 12 is a side view showing how light is diffused in the linear light source which includes a linear material containing a light diffusing substance in a core layer.

FIG. 12 is a side view showing how light is diffused in a linear light source 30b including a linear material 11c. The linear light source 30b is different from the linear light source 20 in that the linear light source 30b includes the linear material 11c in place of the linear material 11. The linear material 11c is obtained by causing a core layer in an internal structure of the linear material 11 to contain a light diffusing substance 31.

In the linear light source 30b, the light that enters a corresponding one of end surfaces of the linear material 11c is diffused, in a core part of the linear material 11b, by the light diffusing substance 31, while it is propagating in the linear material 11b. This causes the light thus diffused to be directed outside the linear material 11c while passing through an outer surface of the linear material 11c. The linear material 11c therefore looks brighter. It is therefore possible to realize a light source for emitting light less significant in luminance unevenness and brighter in luminance.

In the linear light source 30a (30b), a diffusing effect of the linear material 11b (11c) allows controlling of how long the light that enters the corresponding one of the end surfaces of the linear material 11b (11c) propagates in the linear material 11b (11c). Note, however, that this needs to design the linear material as usage.

Figure 13:
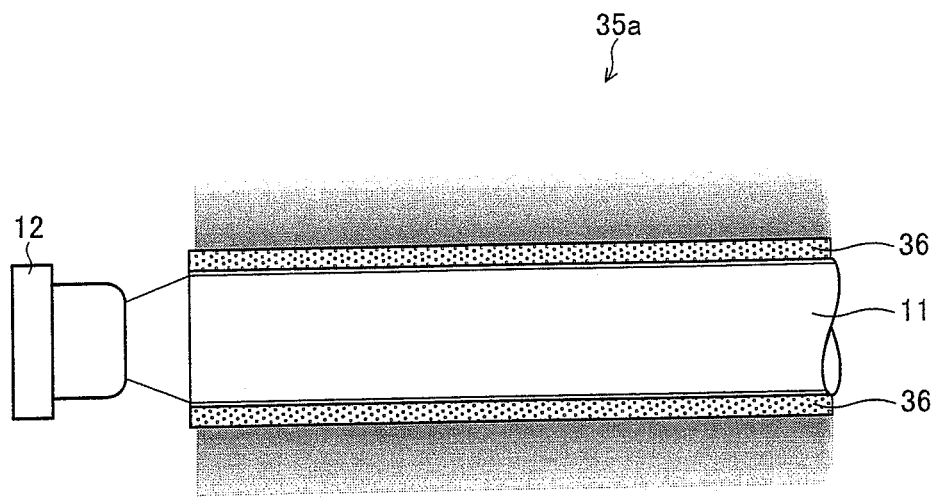
FIG. 13 is a side view showing how light is emitted by the linear light source which includes a linear material having its outer circumference surface coated by a light emitter.

FIG. 13 is a side view showing how light is emitted from a linear light source 35a that includes a linear material 11 which is coated with a fluorescent material 36. The linear light source 35a is different from the linear light source 20 in that the linear material 11 is coated with the fluorescent material 36. Note that FIG. 13 shows the fluorescent material 36 in an exaggerated manner so as to clearly show that the linear material 11 is coated with the fluorescent material 36.

In the linear light source 35a, the light that enters a corresponding one of end surfaces of the linear material 11 excites the fluorescent material 36 in the vicinity of an outer circumference surface of the linear material 11, while it is propagating in the liner material 11. As such, the light emitted from the light emitting device 12 and light emitted from the fluorescent material 36 are directed outside the linear material 11 while passing through an outer surface of the linear material 11. It is therefore possible to cause the linear material 11 to emit light which has a desired color.

This makes it possible to obtain a light source whose light color is as usage. For example, in a case where (i) the light emitting device 12 emits blue light and (ii) the fluorescent material 36 is selectively made from a yellow light material, it is possible to realize a light source for emitting white light which includes the blue light of the light emitting device 12 and yellow light of the fluorescent material 36.

Figure 14:
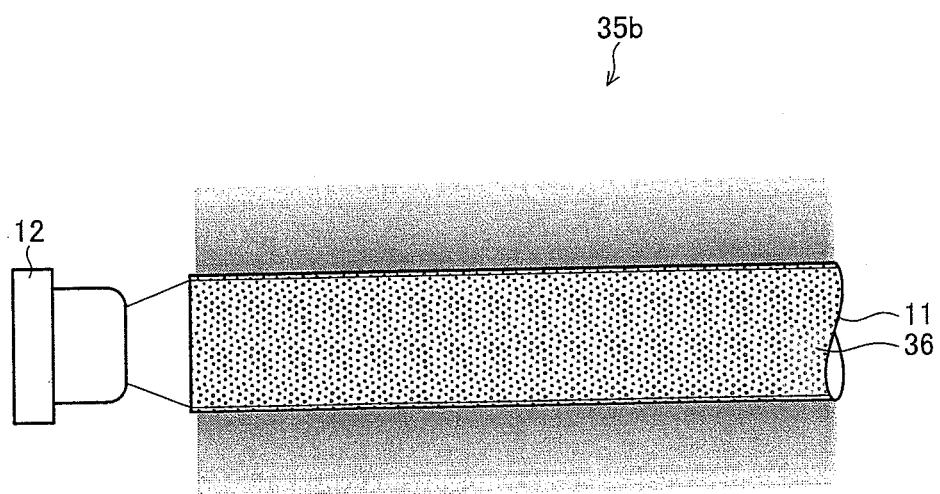
FIG. 14 is a side view showing how light is emitted by the linear light source which includes a linear material containing a light emitter mixed in its inner part.

FIG. 14 is a side view showing how light is emitted by a linear light source 35b that includes a linear material 11 in which a fluorescent material 36 is mixed. The linear light source 35b is different from the linear light source 20 in that the fluorescent material 36 is mixed in the linear material 11.

According to the linear light source 35b, light that enters a corresponding one of end surfaces of the linear material 11 excites the fluorescent material 36, while it is propagating in the linear material 11. As such, light emitted from a light emitting device 12 and light emitted from the fluorescent material 36 are directed outside the linear material 11 while passing through an outer surface of the linear material 11. As such, it is possible to cause the linear material 11 to emit light which has a desired color. According to the linear light source 35b, it is also possible to cause the inside of the linear material 11 to emit light which has the desired color.

Note that it is possible to use a conventionally known light diffusing substance as the light diffusing substance 31. In this regarding, it is possible to determine, as usage, (i) how much light diffusing substance 31 should be contained and (ii) in which region of the linear material 11 the light diffusing substance 31 should be contained. Also, it is possible to use, as the fluorescent material 36, one of conventionally known fluorescent materials which have respective various colors. In this regarding, it is possible to determine, as usage, (i) how much fluorescent material 36 should be contained and (ii) how the fluorescent material 36 should be contained in the linear material 11.

Embodiment 3

Embodiment 3 of the present invention is described below with reference to the drawings. A configuration which is not discussed in the present embodiment is identical with the configurations discussed in Embodiments 1 and 2. For easy description, members having the same functions as the members shown in the drawings in Embodiments 1 and 2 are given the same reference numerals, and their description is omitted.

Generally, there is a risk that self-heating by a light source or the like adversely affects light property of the light source. An influence of self-heating by a light emitting device is so great that light property of the light source is greatly affected, particularly in the illumination device of the foregoing patent literature 4 discussed in Background in which the light emitting device and the optical fiber are integrated with each other. On this account, in a case where a linear light source is used as an illuminator that emits light at greater light intensity, it is desired that the linear light source employ a heat release design for reducing the influence of the self-heating by the light emitting device.

Figure 15:
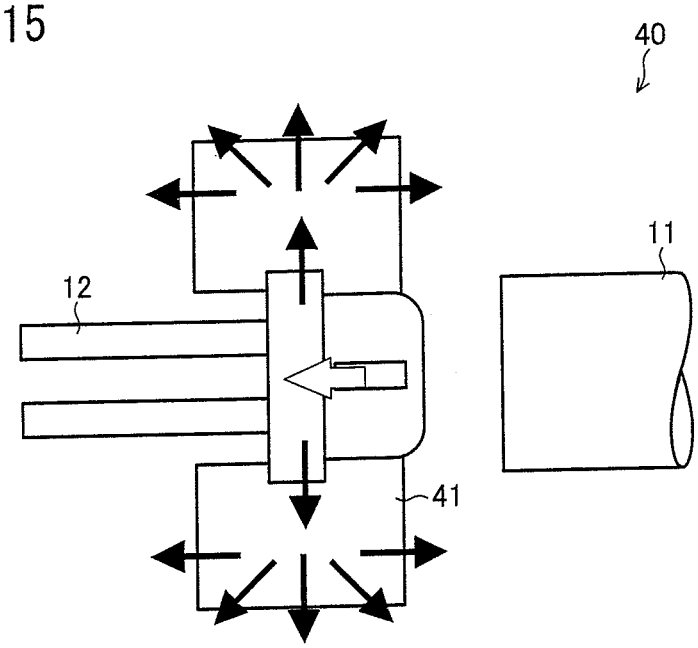
FIG. 15 is a side view showing a linear light source in accordance with still another embodiment of the present invention.

FIG. 15 is a cross sectional view showing one example of how a linear light source 40 is configured.

As shown in FIG. 15, the linear light source 40 is different from the linear light source 20 of Embodiment 1 in that the linear light source 40 further includes a heat sink 41. Note that, obviously, the linear light source 40 is not limited to the linear light source 20 of Embodiment 1. Instead, the linear light source 40 can be applied to any of linear light sources including the light emitting device 12.

The heat sink 41 is made of metal. The heat sink 41 is provided so that the heat sink 41 and a light emitting device 12 form a pair. The heat sink 41 is shaped (i) so as to hold the light emitting device 12 and (ii) so that a light emitting surface and an electrode section of the light emitting device 12 are exposed in the heat sink 41. Note that an outer shape of the heat sink 41 can be varied depending on usage and a space available.

Since the linear light source 40 includes the heat sink 41, the self-heating by the light emitting device 12 can be efficiently released. It is therefore possible to prevent the heat generated by the light emitting device 12 from causing a deterioration in light property.

The heat sink 41 can be made alternatively from a peltiert element. In this case, it is possible to control the heat sink 41 to have a low temperature. It is therefore possible to efficiently release heat.

Figure 16:
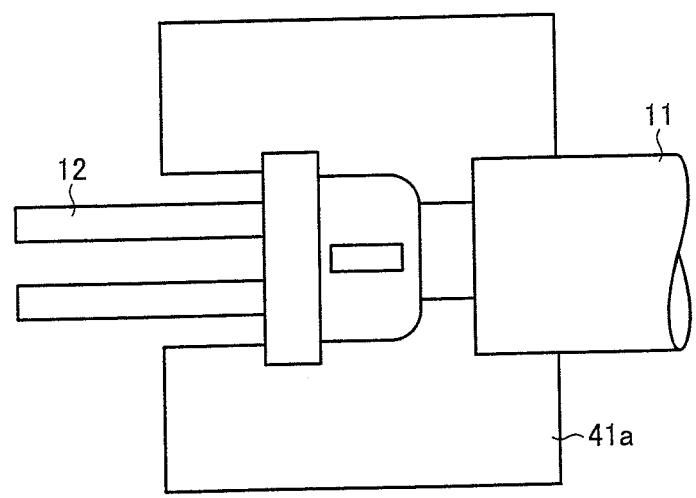
FIG. 16 is a side view showing still another example of a heat sink of the linear light source.

Further, the shape of the heat sink 41 is not limited to the shape shown in FIG. 15. For example, the heat sink 41 can be shaped, as shown in FIG. 16, so that both the linear material 11 and the light emitting device 12 are held inside the heat sink 41. According to this shape, the heat sink 41 is shaped so as to (i) match a shape of the light emitting device 12 and a diameter of the linear material 11, and so as to (ii) have a space that causes the light emitted from the light emitting device 12 to enter the linear material 11 efficiently. Thus, by providing a heat sink 41a having such a shape, it is possible to improve the light coupling rate of the light emitting device 12 and the linear material 11.

Embodiment 4

Embodiment 4 of the present invention is described below with reference to the drawings. A configuration which is not discussed in the present embodiment is identical with the configurations discussed in Embodiments 1 to 3. For easy description, members having the same functions as the members shown in the drawings in Embodiments 1 to 3 are given the same reference numerals, and their description is omitted.

Generally, light emitted from a semiconductor laser spreads out progressively as the light goes straight ahead. This causes a problem that, in a case where a semiconductor laser device is in particular used as the light emitting device 12, light that does not enter the linear material 11 is increased. Thus, in the case where the semiconductor laser device is used as the light emitting device 12, it is desired to provide means (optical device) for causing light emitted from the light emitting device 12 to enter the linear material 11 efficiently.

Figure 17:
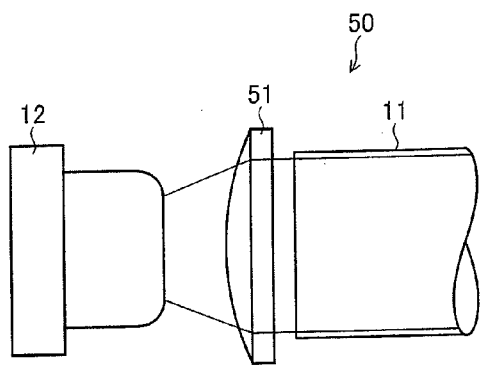
FIG. 17 is a side view showing a linear light source in accordance with still another embodiment of the present invention.

FIG. 17 is a cross sectional view showing one example of how a linear light source 50 is configured.

As shown in FIG. 17, the linear light source 50 further includes a collimator lens 51 in addition to the configuration of the linear light source 20 of Embodiment 1 which includes the semiconductor laser device as the light emitting device 12. Note that, obviously, the linear light source 50 is not limited to the linear light source 20 of Embodiment 1. Instead, the linear light source 50 can be applied to any of the linear light sources including the light emitting device 12.

The collimator lens 51 is provided so that the collimator lens 51 and the light emitting device 12 form a pair. The collimator lens 51 is provided between the light emitting device 12 and the linear light material 11. The collimator lens 51 is configured so as to collimate light in accordance with a size of an end of the linear material 11 via which end the light emitted from the light emitting device 12 enters the linear material 11.

In the linear light source 50, the light emitted from the semiconductor laser is collimated by the collimator lens 51, and enters the linear material 11 as collimated light. The light emitted from the semiconductor laser thus enters the linear material 11 efficiently. It is therefore possible to reduce an amount of useless light that does not enter the linear material 11.

Note that the means for causing the light emitted from the light emitting device 12 to enter the linear material 11 efficiently is not limited to the collimator lens 51. Instead, an optical device such as a lens for converting light emitted from the light emitting device 12 to spotlight can be used as the means.

In a case of a linear light source like the linear light source 25 of Embodiment 1 which includes a light emitting device 26 including a built-in light section, there is a drawback that an amount of light that enters a light receiving section 27 is reduced. This is because light propagating in a front direction is often blocked by a light emitting device 12 so that only a decreased amount of the light enters a light receiving section 27. In this case, the amount of light that enters the light receiving section 27 cannot be detected with high accuracy. In a case of employing the light emitting device 26, it is therefore desired to provide means (optical device) for causing the light propagating in the linear material 11 to enter the light receiving section 27 efficiently.

Figure 18:
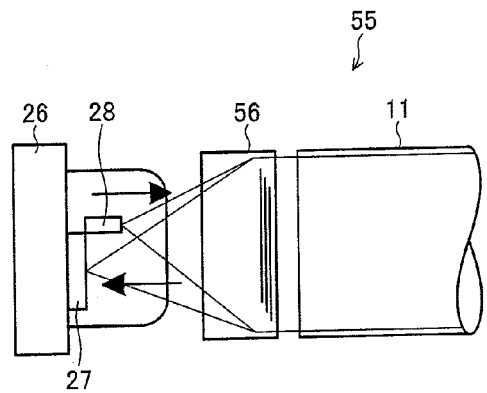
FIG. 18 is a side view showing a linear light source in accordance with still another embodiment of the present invention.

FIG. 18 is a cross sectional view showing one example of how a linear light source 55 is configured.

As shown in FIG. 18, the linear light source 55 is different from the linear light source 25 of Embodiment 1 in that the linear light source 55 further includes a hologram device 56 for bringing about a light diffraction effect. Note that, according to the linear light source 55, a light emitting device 26 having a built-in light receiving section is configured so that a light receiving surface of a light receiving section 27 and a light emitting surface of a light emitting section 28 are provided in respective different planes.

The hologram device 56 is provided between the light emitting device 26 and the linear material 11. The hologram device 56 has a predetermined diffraction pattern for causing light coming in a front direction to be diffracted so as to enter the light receiving section 27.

The linear light source 55 is configured so that light propagating in the front direction (i.e., light which is emitted from the light emitting device 12 and propagates in the linear material 11, the light emitting device 12 being provided on side of that end of the linear material 11 which is opposite to an end on which side the light emitting device 26 is provided) suitably enters the light receiving section 27. It is therefore possible to improve the accuracy of detection of a light propagation amount. This makes it possible to monitor a state of the linear light source 55 with accuracy. Furthermore, in a case where a semiconductor laser is used as the light emitting section 28, it is also possible that the hologram device 56 causes the light emitted from the light emitting device 12 to enter the linear material 11 efficiently.

Embodiment 5

Embodiment 5 of the present invention is described below with reference to the drawings. A configuration which is not discussed in the present embodiment is identical with the configurations discussed in Embodiments 1 to 4. For easy description, members having the same functions as the members shown in the drawings in Embodiments 1 to 4 are given the same reference numerals, and their description is omitted.

Figure 19:
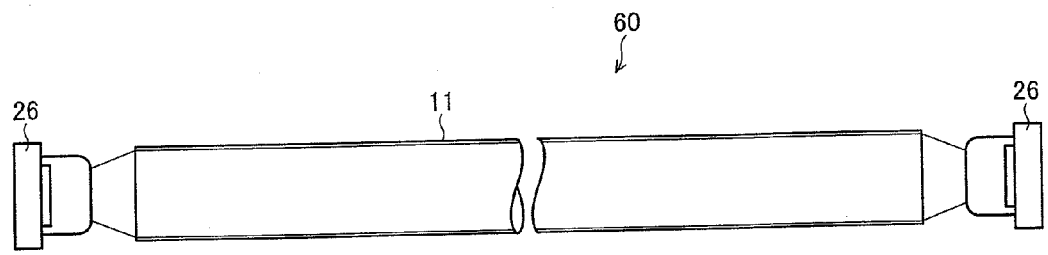
FIG. 19 is a side view showing a linear light source in accordance with still another embodiment of the present invention.

FIG. 19 is a side view showing one example of how a linear light source 60 is configured.

As shown in FIG. 19, the linear light source 60 includes (i) a linear material 11 and (ii) light emitting devices 26 which are provided on respective end sides of the linear material 11 and each of which includes a built-in light receiving section. That is, the linear light source 60 is configured so that light emitting means and light receiving means are provided on each of the end sides of the linear material 11. In a linear light source configured like the linear light source 60 so as to include two (2) light emitting means provided on respective end sides of a linear material 11, both of the two (2) light emitting means are normally turned on concurrently so that it is possible to obtain an increase in luminescence intensity.

However, the linear light source configured like the linear light source 60 has a drawback that, in a case where the two (2) light emitting means are concurrently turned on, each of the two (2) light receiving means receives light emitted from both of the two (2) light emitting means, so that the accuracy of detection of a light propagation amount becomes unstable. In order to overcome the problem, it is desired for each timing of a light emission operation and a light reception operation to be controlled in case of a linear light source like the linear light source 60.

Figure 20:
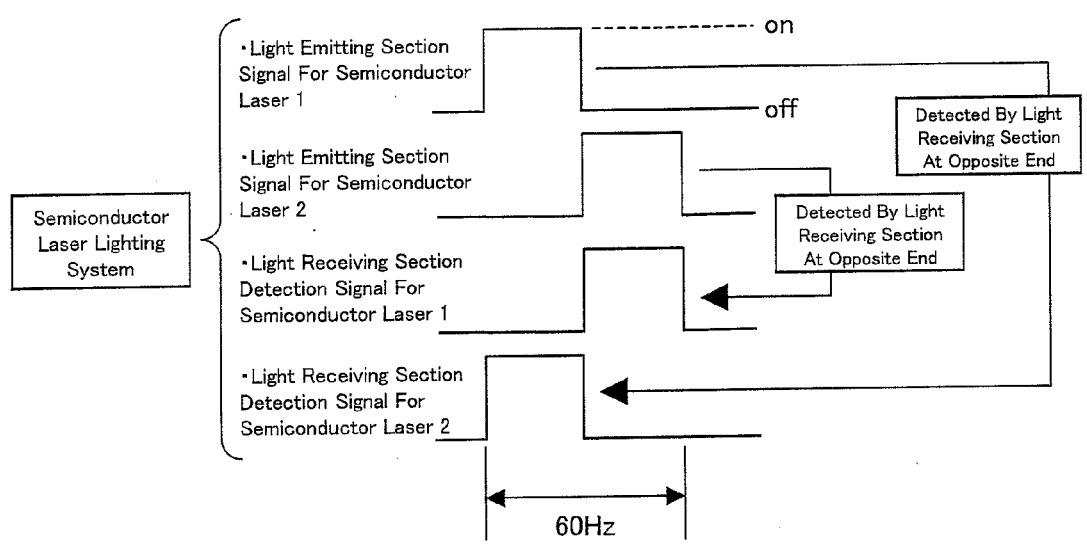
FIG. 20 is a view showing a lighting system of the linear light source.

FIG. 20 is a view showing one example of a pattern how each of the light emitting devices 26 of the linear light source 60 carries out a light emission operation and a light reception operation. Note that, for easy description, one of the light emitting devices 26 is referred to as a semiconductor laser 1 and the other of the light emitting devices 26 is referred to as a semiconductor laser 2.

As shown in FIG. 20, the semiconductor laser 1 starts a light emission operation at timing when the semiconductor laser 2 starts a light reception operation. During the operations, the semiconductor laser 1 is controlled not to receive light and the semiconductor laser 2 is controlled not to emit light. Specifically, from controlling means or other similar means (not shown in FIG. 20), the semiconductor laser 1 receives a light emitting section signal for driving the light emitting section 28 concurrently with the semiconductor laser 2 receiving a light receiving section detection signal for driving the light receiving section 27.

Subsequently, the semiconductor laser 2 starts a light emission operation concurrently with the semiconductor laser 1 starting a light reception operation. During the time when the semiconductor laser 2 is engaged in the light emission operation, a light reception function of the semiconductor laser 2 is turned off, whereas during the time when the semiconductor laser 1 is engaged in the light reception operation, a light emission function of the semiconductor laser 1 is turned off. Specifically, from the controlling means or other similar means, (i) the semiconductor laser 1 receives a light receiving section detection signal for driving the light receiving section 27, concurrently with the semiconductor laser 2 receiving a light emitting section signal for driving the light emitting section 28.

As described above, the light emission operations of the semiconductor lasers 1 and 2 are alternated. Further, each of the semiconductor lasers 1 and 2 carries out a light reception operation between light emission operations. Thus, each of the semiconductor lasers 1 and 2 emits light at a corresponding different timing. It is therefore possible to prevent an occurrence of interference between light emitted from one of the light emitting sections 28 and light emitted from the other of the light emitting sections 28. This makes it possible that the light propagation amount of the light emitted from a light emitting section 28 of one of the light emitting devices 26 is independently detected by a light receiving section 27 of the other of the light emitting devices 26.

It is desired that the light emission operations of the respective light emitting sections 28 be alternated at a given cycle. For example, in a case where the light emitting sections 28 are driven at 60 Hz, it is possible to bring about an afterimage effect on human eyes.

Embodiment 6

Embodiment 6 of the present invention is described below with reference to the drawings. A configuration which is not discussed in the present embodiment is identical with the configurations discussed in Embodiments 1 to 5. For easy description, members having the same functions as the members shown in the drawings in Embodiments 1 to 5 are given the same reference numerals, and their description is omitted.

Figure 21:
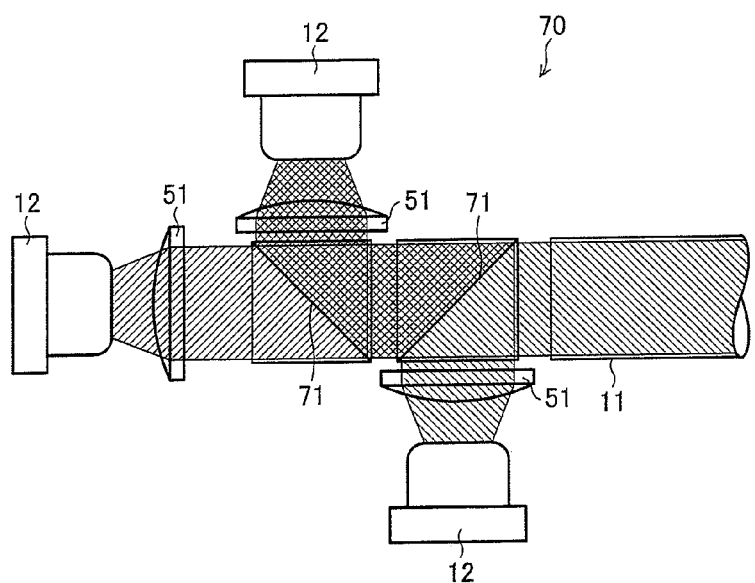
FIG. 21 is a side view showing a linear light source in accordance with still another embodiment of the present invention.

FIG. 21 is a side view showing one example of how a linear light source 70 is configured.

As shown in FIG. 21, the linear light source 70 includes a linear material 11, three (3) light emitting devices 12, and three (3) collimator lens 51. Note that the linear light source 70 includes, on one end side (not shown in FIG. 21) of the linear material 11, a light receiving device 21 or a light emitting device 26 having a built-in light receiving section. Further, the number of light emitting devices 12 is not limited to three (3).

Reflection mirrors 71 are provided in the linear material 11 so as to partition an inner region of the linear material 11. The three (3) light emitting devices 12 are provided so that light emitted from each of the three (3) light emitting devices 12 enters a corresponding partitioned region in the internal region of the linear material 11. Note that two (2) of the three (3) light emitting devices 12 are provided so as to emit light toward an outer circumference surface of the linear material 11. Semiconductor lasers are used as the respective three (3) light emitting devices 12, and each of the semiconductor lasers emits laser light having a different wavelength. Each of the three (3) collimator lenses 51 is provided between a corresponding one of the three (3) light emitting devices 12 and the linear material 11.

According to the linear light source 70, the three (3) light emitting devices 12 are concurrently turned on so that it is possible to cause the linear material 11 to emit light having a plurality of colors. It is therefore possible to realize a color light source for emitting light of a variety of colors as usage.

Note that, in a case where a linear material 11 is prepared by a combination of members having respective different light diffusing properties, it is possible to realize a light source capable of carrying out effective illumination expression.

Figure 22:
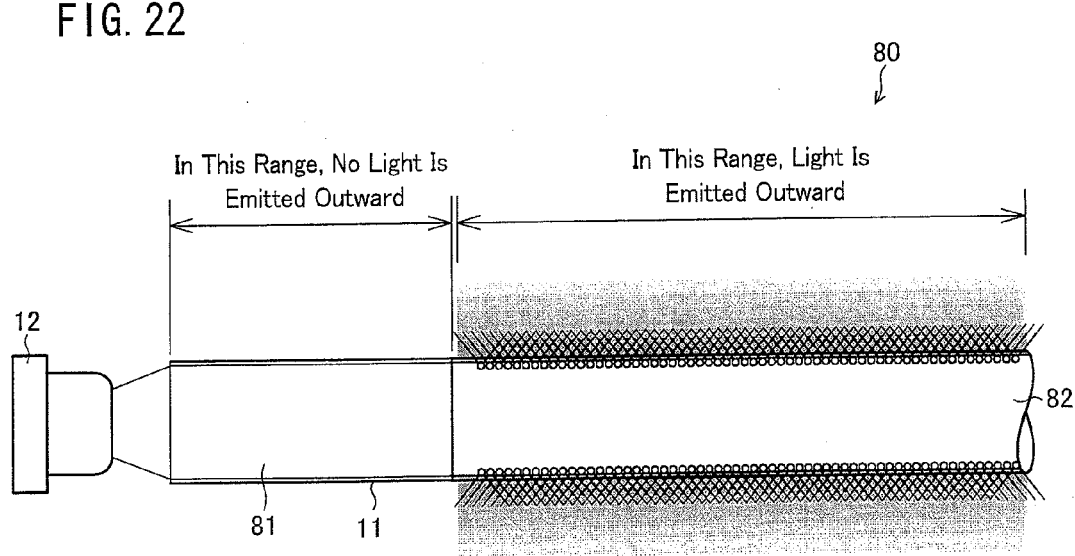
FIG. 22 is a side view showing a linear light source in accordance with still another embodiment of the present invention.

FIG. 22 is a view showing one example of how a linear light source 80 is configured. (a) and (b) of FIG. 23 are cross sectional views showing the linear light source 80. (a) of FIG. 23 shows a cross section of a first linear material part 81. (b) of FIG. 23 shows a cross section of a second linear material part 82.

According to the linear light source 80, a linear material 11 is configured by combining a plurality of parts (the first and second linear material parts 81 and 82) whose side emission amounts are different from each other (see FIG. 22). That is, according to the linear material 11, the first and second linear material parts 81 and 82 are made from respective different materials.

As shown in (a) of FIG. 23, the first linear material part 81 is made up of two layers which are a core part 81a and a clad part 81b. Both of the core part 81a and the clad part 81b are made of a material such as a resin. The core part 81a is configured so as to have a greater refractive index than that of the clad part 81b (i.e., the refractive index of the core part 81a>the refractive index of the clad part 81b).

This causes the first linear material part 81 to have very low outward light diffusibility. This is why the first linear material part 81 brings about no scattering effect and therefore emits a very limited amount of light from its side surface. Further, according to the first linear material part 81, (i) the very limited amount of light is emitted from the side surface and (ii) the core part 81a has the refraction index greater than that of the clad part 81b. As such, the first linear material part 81 has very great forward light-propagation efficiency. The first linear material part 81 achieves very low outward light diffusibility and very great forward light-propagation efficiency. That is, the first linear material part 81 has a very small side emission amount.

As shown in (b) of FIG. 23, the second linear material part 82 is made up of two layers which are a core part 82a and a clad part 82b. The core part 82a is made of a scatterer such as special acrylic. The clad part 82b is made of a material such as a resin. As such, the second linear material part 82 scatters propagating light outward so as to emit a very large amount of light from a side surface. The second linear material part 82 thus achieves very high outward light diffusibility. That is, the second linear material part 82 has a side emission amount which is much larger than that of the first linear light emitting part 81.

According to the linear light source 80, the first linear material part 81 emits no light outward, whereas the second linear material part 82 emits light outward. In a part of the linear material 11 where the linear material 11 and the light emitting device 12 are linked, it is often the case that no light emission is needed. Thus, the linear material 11 is prepared so that (i) a part of the linear material 11 where no light emission is needed is constituted by the first linear material part 81 which is smaller in side emission amount and (ii) a part of the linear material 11 where it is necessary for light to be emitted outward is constituted by the first linear material part 81 which is greater in side emission amount. It is therefore possible to obtain an increase in use efficiency of light.

FIGS. 24 and 25 show examples of illumination patterns for which light display is needed on a surface of a board 83. As shown in FIGS. 24 and 25, a linear light source 80 is mounted on the board 83 so that (i) a part of a linear material 11 is on the front surface of the board 83 and (ii) a light emitting device 12 is on a rear surface of the board 83. In this case, the linear light source 80 should be configured so that (i) a part of the linear material 11 where no light emission is needed is constituted by a first linear material part 81 and (ii) a part of the linear material 11 where it is desired that light emission be viewed from the outside of the light source 80 is constituted by a second linear material part 82. This allows only a part of the linear material 11 on a front surface side of the board 83 to look bright.

Embodiment 7

Embodiment 7 of the present invention is described below with reference to the drawings. A configuration which is not discussed in the present embodiment is identical with the configurations discussed in Embodiments 1 to 6. For easy description, members having the same functions as the members shown in the drawings in Embodiments 1 to 6 are given the same reference numerals, and their description is omitted.

The present embodiment describes examples of how the linear light sources of Embodiments 1 to 6 are used. For easy description, each linear light source of Embodiments 1 to 6 is hereinafter referred to as linear light sources 100.

FIG. 26 is a view showing one example in which an air conditioner 110 includes a linear light source 100.

The linear light source 100 includes, for example, a red light emitting device 12 and a blue light emitting device 12. The linear light source 100 emits blue light during a cooling operation, whereas emits red light during a heating operation. That is, the linear light source 100 carries out light emission by selecting and driving the red light emitting device 12 or the blue light emitting device 12. Thus, the linear light source 100 can realize function display by carrying out light display. Therefore, the linear light source 100 can be used as an indicator which allows a user to recognize or to be informed of which operation the air conditioner 100 is in.

Note that the linear light source 100 can be used in any household electrical appliance other than the air conditioner 100 so as to carry out function display. Particularly, in a case where a semiconductor laser device is used as the light emitting device 12, the linear light source 100 can be used as a linear illumination apparatus. In this case, it can be expected that the linear illumination apparatus brings about a greater display effect, as compared to a case in which any other light source, such as a normal LED light source, is used as the linear illumination apparatus.

FIG. 27 is a view showing an example in which a display apparatus 120 includes linear light sources 100.

As shown in FIG. 27, the display apparatus 120 includes (i) a liquid crystal device 121 for displaying an image and (ii) linear light sources 100 provided behind the liquid crystal device 121. According to the linear light sources 100, a wavelength of light emitted by a fluorescent material 36 and a wavelength of light emitted by a light emitting device 12 are combined so that the linear light source 100 serves as, for example, a white light source. It is therefore possible to use the linear light sources 100 as a backlight in an arrangement similar to a currently available CCFL (cold cathode fluorescent lamp).

FIG. 28 is a view showing one example of how a front surface of an illumination apparatus 130 is configured which employs linear light sources 100. FIG. 29 is a view showing one example of how a rear surface of the illumination device 130 shown in FIG. 28 is configured.

As shown in FIG. 28, it is possible to carry out any text display by using a combination of by combining two or more light sources 100 while making use of light rectilinear propagation and bendability of the linear light sources 100. Further, as shown in FIG. 29, the linear light sources 100 are provided on a table material 131, by causing the light emitting devices 12 to extend from a rear surface to a front surface of the table material 131 so that the light emitting devices 12 are provided on a rear surface of the table 131. It is therefore possible to prevent the light emitting devices 12 from being viewed from above of the front surface of the table material 131.

Thus, the linear light sources 100 can be substituted for conventionally-used neon tubes in which gas discharge is carried out. Particularly, in a case where a laser light source, such as a semiconductor laser device, is used as the light emitting device 12, the light propagation efficiency is improved and it is possible to expect an illumination effect such as glare inherent in the laser light.

The present invention is not limited to the description of the embodiments above, but may be altered by a skilled person within the scope of the claims. An embodiment based on a proper combination of technical means disclosed in different embodiments is encompassed in the technical scope of the present invention.

As discussed so far, a linear light source of the present invention includes: a first light emitting device, provided on a side of one end of the linear material, which emits light so that the light enters the one end of the linear material; and a light receiving device, provided on a side of the other end of the linear material, which detects the light which has propagated in the linear material.

According to the configuration, light having propagated in the linear material is detected by the light receiving device. Regarding this, in an abnormal case where (i) the linear material is broken and/or unexpectedly bent, and/or (ii) the light emitting device has a failure in its function and/or is displaced, there will be a great change in a light propagation amount detected by the light receiving device, as compared to a normal case. It is therefore possible to provide a linear light source in which an occurrence of the abnormal case can be detected by checking the light propagation amount.

It is preferable that the linear light source of the present invention be configured so that the first light emitting device is electrically disconnected based on a light propagation amount detected by the light receiving device. According to this preferable configuration, in a case of an abnormal situation such as an abnormal situation in which the linear material is broken, light emission by the first light emitting device is stopped. It is therefore possible that, in such an event, no light will be emitted from the linear light source.

Further, it is preferable that the linear light source of the present invention includes a second light emitting device including the light receiving device which is built in the second light emitting device, the second light emitting device emitting light so that the light enters the other end of the linear material. According to this preferable configuration, light enters both ends of the linear material so that it is possible to cause an increase in emission intensity of the linear light source.

Further, it is preferable that the linear light source of the present invention is configured so that: the light receiving device further detects an emission amount of the second light emitting device, and the second light emitting device emits the light whose luminescence intensity is adjusted based on the emission amount detected by the light receiving device.

In order that light is emitted preferably, it is further preferable that the linear light source of the present invention is configured so that an inner part of the linear material contains a light diffusing substance.

Also, in order that light having a desired color is emitted, it is preferable that the linear light source of the present invention is configured so that (i) an outer circumference surface of the linear material is coated with a fluorescent material, or (ii) a fluorescent material is mixed in the linear material.

Further, it is preferable that the linear light source of the present invention is configured so that: the first light emitting device is a semiconductor laser; and the first light emitting device is provided with an optical device for causing light emitted from the first light emitting device to be converted to collimated or spotted light so that the collimated light or the spotted light enters the linear material. According to this preferable configuration, it is therefore possible that the light emitted from the first light emitting device enters the linear material efficiently.

Further, it is preferable that the linear light source of the present invention further includes a plurality of semiconductor lasers, each of which is provided so as to emit light toward an outer circumference surface of the linear material, the light emitted by each of the plurality of semiconductor lasers has a corresponding different wavelength. According to this preferable configuration, it is possible to cause the linear material to emit light of a plurality of colors, by causing the first light emitting device (the second light emitting device) and the plurality of semiconductor lasers to emit light concurrently.

Further, it is preferable that the linear light source of the present invention is configured so that the linear material is made up of a plurality of parts whose side emission amounts are different from each other. According to this preferable configuration, the linear material is prepared so that (i) a part of the linear material where no light emission is needed is constituted by a part having a smaller side emission amount and (ii) a part of the linear material where it is necessary that light is emitted outward is constituted by a part having a larger side emission amount. It is therefore possible to cause an increase in use efficiency of light.

A linear light source of the present invention includes: first and second light emitting devices which are provided respectively on sides of first and second ends of a linear material and which include first and second built-in light receiving devices respectively, the first and second light emitting devices emitting first and second light so that (i) the first and second light respectively enter the first and second ends of the linear material, and (ii) the first built-in light receiving device detects the second light which has propagated in the linear material, whereas the second built-in light receiving device detects the first light which has propagated in the linear light material.

According to the configuration, the first light having propagated in the linear material is detected by the second built-in light receiving device, whereas the second light having propagated in the linear material is detected by the first built-in light receiving device. Regarding this, in an abnormal case where (i) the linear material is broken and/or unexpectedly bent, and or (ii) the light emitting device has a failure in its function and/or is displaced, there will be a great change in light propagation amounts detected by the first and second built-in light receiving devices, as compared to a normal case. It is therefore possible to provide a linear light source in which an occurrence of the abnormal case can be detected by checking the light propagation amounts.

Further, it is preferable that the linear light source of the present invention is configured so that (i) the first light emitting device is electrically disconnected based on a light propagation amount detected by the second built-in light receiving device and (ii) the second light emitting device is electrically disconnected based on a light propagation amount detected by the first built-in light receiving device. According to this preferable configuration, in an abnormal case such as a case in which the linear material is broken, the first and second light emitting devises are stopped from being operating. It is therefore possible to make sure that no light is emitted outward.

Further, it is preferable that the linear light source of the present invention be configured so that: (i) the first built-in light receiving device further detects a first light emission amount of the first light emitting device, the first built-in light receiving device and the first light emitting device being provided in a first package and (ii) the second built-in light receiving device further detects a second light emission amount of the second light emitting device, the second built-in light receiving device and the second light emitting device being provided in a second package; and (a) the first light emitting device emits light whose luminous intensity is adjusted based on the first light emission amount detected by the first built-in light receiving device and (b) the second light emitting device emits light whose luminous intensity is adjusted based on the second light emission amount detected by the second built-in light receiving device.

In order that light emission is carried out preferably, it is preferable that the linear light source of the present invention is configured so that a light diffusing substance is contained in the linear material.

Also, in order that light having a desired color is emitted, it is preferable that the linear light source of the present invention is configured so that (i) an outer circumference surface of the linear material is coated with a fluorescent material, or (ii) a fluorescent material is mixed in the linear material.

Further, it is preferable that the linear light source of the present invention further includes: a first hologram pattern device for causing the second light which has propagated in the linear material to be diffracted so as to enter the first built-in light receiving device; and a second hologram pattern device for causing the first light which has propagated in the linear material to be diffracted so as to enter the second built-in light receiving device. According to this preferable configuration, the first light having propagated in the linear material suitably enters the second built-in light receiving device, whereas the second light having propagated in the linear material suitably enters the first built-in light receiving device. It is therefore possible to cause an increase in accuracy of detection of the first and second light by the first and second built-in light receiving devices.

Further, it is preferable that the linear light source of the present invention is configured so that: the first and second light emitting devices alternately carry out their respective light emission operations, and each of the first and second light emitting devices carries out its light reception operation between light emission operations. According to this preferable configuration, it is possible to prevent an occurrence of interference between the first and second light, and to detect a light propagation amount of the first light independently from detecting of a light propagation amount of the second light.

Further, it is preferable that the linear light source is configured so that the linear material is made up of a plurality of parts whose side emission amounts are different from each other. According to this preferable configuration, the linear material is prepared so that (i) a part of the linear material where no light emission is needed is constituted by a part having a smaller side emission amount and (ii) another part of the linear material where it is necessary that light is emitted outward is constituted by a part having a larger side emission amount. It is therefore possible to cause an increase in use efficiency of light.

An electronic apparatus of the present invention includes any of the linear light sources described above.

The electronic apparatus of the present invention has a function to carry out light display so as to allow a user to recognize or be informed of conveyed information. The electronic apparatus of the present invention can be realized as an electronic apparatus including the linear light source as means for carrying out the light display. Further, the electronic apparatus of the present invention can be also realized as, for example, (i) a display apparatus including the linear light source as a backlight or (ii) an illumination apparatus employing the linear light source.

INDUSTRIAL APPLICABILITY

The present invention is suitably applicable to a filed relating to a linear light source employing an optical fiber that transmits laser light or the like. Further, the present invention is suitably applicable to a filed relating a method for manufacturing the linear light source. Furthermore, the present invention is widely applicable to a filed relating to a display backlight, a household electrical appliance with a light display function, an illumination device using a neon tube, or the like.

REFERENCE SIGNS LIST 10, 10a, 15, 15a, 20, 25, 30, 30a, 30b, 35a, 35b, 40, 50, 55, 60, 70, 80, 100. linear light source
11, 11a, 11b, 11c. linear material
12. light emitting device (first light emitting device)
12a. LED device
12b. semiconductor laser device
21. light receiving device
26. light emitting device including built-in light receiving section (light emitting device including built-in light receiving device)
27. light receiving section (light receiving device)
28. light emitting section (second light emitting device, light emitting device)
31. light diffusing substance
36. fluorescent material
41, 41a. heat sink
51. collimator lens (optical device)
56. hologram device (hologram pattern device)
81. first linear material part
82. second linear material part
110. air conditioner (electronic device)
120. display device
130. illumination device

The invention claimed is:

1. A linear light source, which emits light by causing light to propagate in a linear material in which incoming light can be propagated, comprising:
a first light emitting device, provided on a side of one end of the linear material, which emits light so that the light enters the one end of the linear material; and
a light receiving device, provided on a side of the other end of the linear material, which detects the light which has propagated in the linear material,
wherein the first light emitting device is electrically disconnected based on a light propagation amount detected by the light receiving device.

2. The linear light source, which emits light by causing light to propagate in a linear material in which incoming light can be propagated, comprising:
a first light emitting device, provided on a side of one end of the linear material, which emits light so that the light enters the one end of the linear material;
a light receiving device, provided on a side of the other end of the linear material, which detects the light which has propagated in the linear material; and
a second light emitting device including the light receiving device which is built in the second light emitting device, the second light emitting device emitting light so that the light enters the other end of the linear material.

3. The linear light source as set forth in claim 2, wherein:
the light receiving device further detects an emission amount of the second light emitting device, and
the second light emitting device emits the light whose luminescence intensity is adjusted based on the emission amount detected by the light receiving device.

4. The linear light source, which emits light by causing light to propagate in a linear material in which incoming light can be propagated, comprising:
a first light emitting device, provided on a side of one end of the linear material, which emits light so that the light enters the one end of the linear material;
a light receiving device, provided on a side of the other end of the linear material, which detects the light which has propagated in the linear material; and
a plurality of semiconductor lasers, each of which is provided so as to emit light toward an outer circumference surface of the linear material, the light emitted by each of the plurality of semiconductor lasers has a corresponding different wavelength.

5. The linear light source, which emits light by causing light to propagate in a linear material in which incoming light can be propagated, comprising:
a first light emitting device, provided on a side of one end of the linear material, which emits light so that the light enters the one end of the linear material; and
a light receiving device, provided on a side of the other end of the linear material, which detects the light which has propagated in the linear material,
wherein the linear material is made up of a plurality of parts whose side emission amounts are different from each other.

6. A linear light source, which emits light by causing light to propagate in a linear material in which incoming light can be propagated, comprising:
first and second light emitting devices, respectively provided on sides of first and second ends of the linear material, which include first and second built-in light receiving devices, respectively,
the first and second light emitting devices emitting first and second light so that (i) the first and second light respectively enter the first and second ends of the linear material, (ii) the first built-in light receiving device detects the second light which has propagated in the linear material, and (iii) the second built-in light receiving device detects the first light which has propagated in the linear material.

7. The linear light source as set forth in claim 6, wherein:
(i) the first light emitting device is electrically disconnected based on a light propagation amount detected by the second built-in light receiving device and (ii) the second light emitting device is electrically disconnected based on a light propagation amount detected by the first built-in light receiving device.

8. The linear light source as set forth in claim 6, wherein:
(i) the first built-in light receiving device further detects a first light emission amount of the first light emitting device, the first built-in light receiving device and the first light emitting device being provided in a first package and (ii) the second built-in light receiving device further detects a second light emission amount of the second light emitting device, the second built-in light receiving device and the second light emitting device being provided in a second package; and
(a) the first light emitting device emits light whose luminous intensity is adjusted based on the first light emission amount detected by the first built-in light receiving device and (b) the second light emitting device emits light whose luminous intensity is adjusted based on the second light emission amount detected by the second built-in light receiving device.

9. The linear light source as set forth in claim 6, further comprising:
- a first hologram pattern device for causing the second light which has propagated in the linear material to be diffracted so as to enter the first built-in light receiving device; and
- a second hologram pattern device for causing the first light which has propagated in the linear material to be diffracted so as to enter the second built-in light receiving device.

10. The linear light source as set forth in claim 6, wherein:
the first and second light emitting devices alternately carry out their respective light emission operations, and each of the first and second light emitting devices carries out its light reception operation between light emission operations.

11. The linear light source as set forth in claim 6, wherein the linear material is made up of a plurality of parts whose side emission amounts are different from each other.

12. An electronic apparatus, comprising a linear light source recited in claim 1 or 6.

* * * * *